United States Patent [19]

Wachter

[11] Patent Number: 5,221,648

[45] Date of Patent: Jun. 22, 1993

[54] HIGHLY ATTRITION RESISTANT MESOPOROUS CATALYTIC CRACKING CATALYSTS

[75] Inventor: William A. Wachter, Baton Rouge, La.

[73] Assignee: Exxon Research & Engineering Company, Florham Park, N.J.

[21] Appl. No.: 816,021

[22] Filed: Dec. 30, 1991

[51] Int. Cl.$^5$ .......................... B01J 29/06; B01J 21/08
[52] U.S. Cl. ........................................ 502/68; 502/64; 502/69
[58] Field of Search ........................ 502/68, 70, 76, 69

[56] References Cited

U.S. PATENT DOCUMENTS

| | | | |
|---|---|---|---|
| 3,410,808 | 11/1968 | Smith et al. | 502/70 |
| 3,449,265 | 6/1969 | Gladrow et al. | 502/68 |
| 3,972,835 | 8/1976 | Hoffman et al. | 502/68 |
| 4,987,110 | 1/1991 | Scherzer | 502/68 |
| 5,001,097 | 3/1991 | Pecoraro | 502/68 |

*Primary Examiner*—Carl F. Dees
*Attorney, Agent, or Firm*—Llewellyn A. Proctor; Henry E. Naylor

[57] ABSTRACT

A catalytic cracking catalyst for converting a hydrocarbon feedstock at elevated temperature in the substantial absence of hydrogen, into lower average molecular weight, lower boiling hydrocarbons useful as transportation fuels. The catalyst is a composite of a crystalline aluminosilicate zeolite in concentration ranging as high as about 80 percent, based on the total weight of the catalyst, within a mesoporous silica-alumina matrix. The matrix, preferably, is constituted of silica sols modified by alumina and clay and it is characterized as of polymodal pore size distribution, as measured by mercury porosimetry, a first mode wherein at least 75 percent, preferably about 80 percent to 90 percent, of the pore volume measured between 45 Angstroms and 2000 Angstroms is in pores greater than 160 Angstroms in diameter, and a second mode wherein up to about 20 percent of the pore diameters are greater than 100 Angstroms but less than 160 Angstroms in diameter. These catalysts are highly active, and selective in the production of olefins without high coke made. The attrition-resistance of these catalysts, as measured by the Davison Index, is quite low, ranging generally from about 1 to about 8, more generally from about 1 to about 5, or less.

14 Claims, 8 Drawing Sheets

Figure 2AB: Steamed and Unsteamed Samples of Example 2

HIGHLY ATTRITION RESISTANT MESOPOROUS CATALYTIC CRACKING CATALYSTS

FIELD OF THE INVENTION

This invention relates to a mesoporous catalytic cracking catalyst, or catalysts, a process for the production of such catalyst, or catalysts, and a process utilizing such catalyst, or catalysts, in cracking operations. In particular, it relates a highly attrition-resistant mesoporous fluidized catalytic cracking catalyst, a process for the production of such catalyst, and a process utilizing such catalyst in fluidized catalytic cracking operations.

BACKGROUND

Catalytic cracking, notably fluidized catalytic cracking, FCC, is a well-established industrial process employed by the petroleum industry for converting high boiling hydrocarbon feedstocks to more valuable, lower average molecular weight, lower boiling hydrocarbon products useful as transportation fuels, notably gasoline. In the process, the conversion step is usually conducted by contacting the feedstock, e.g. a heavy gas oil, with a moving bed of particulate catalyst in the substantial absence of hydrogen at elevated temperatures.

The FCC process is cyclic and includes, for example, separate zones for conducting the catalytic reaction, steam stripping, and catalyst regeneration. In the cycle, feedstock is blended with the FCC catalyst in the catalytic reactor, generally referred to as a riser, wherein the conversion reaction is conducted. The lower boiling products are separated from the catalyst in a separator, suitably a cyclone separator, and the carbon deactivated catalyst is passed to a stripper and contacted with steam to remove entrained hydrocarbons; the latter being combined with vapors from the cyclone separator to form a mixture that is transported downstream for further treatment. The coked particulate catalyst is recovered from the stripper and passed to a regenerator, suitably a fluidized bed regenerator, and contacted with a combusting gas, e.g. air, at high temperature to burn off the coke and reactivate the catalyst. Regenerated catalyst is then blended with the feedstock entering the riser, this completing the cycle.

In the process, the particulate FCC catalyst is subjected to great mechanical stresses, unavoidably becoming attrited into smaller particles and escaping into the atmosphere. The escaping particulates not only pollute the atmosphere, but makeup catalyst must be added to the reactor. This, of course, is burdensome to the FCC operation. Accordingly, it is necessary that FCC catalysts be highly attrition-resistant.

FCC catalysts contain active crystalline aluminosilicate components such as zeolites, and active inorganic oxide components, notably clays of the kaolin type, dispersed within an inorganic oxide matrix formed from amorphous gels or sols which, on drying, bind the components together. It is desirable that the matrix also be active, attrition-resistant, selective with respect to the production of hydrocarbon liquids, and not readily deactivated by metals. Until recently the zeolite content of the FCC catalysts was low enough that the pore structure of the matrix was tailored to favor activity and selectivity over strength, or attrition resistance. However, present FCC catalysts contain high amounts of zeolitic material, above about 40 weight percent; sometimes as high as 60 weight percent, and greater. At these high concentrations of zeolite it is difficult to maintain a pore structure of high mesoporosity which is highly active and selective, while at the same time remaining highly attrition-resistant.

This is particularly so when it has become necessary, in order for refiners to maintain the profitability of their FCC units, to increase the feed rate, add higher molecular weight, lower quality feeds, and increase reactor temperature or the activity of the FCC catalysts, or both; conditions which can cause diffusional restraints that decrease the selectivity of the FCC catalysts to produce the desired high quality naphthas, as well as increase coke yield. Thus, high mesoporosity increases olefin and liquid yields, and lowers coke yields. However, increased mesoporosity is known to decrease the attrition-resistance of the catalyst. Thus, to affect these adverse consequences by increasing the mesoporosity of the FCC catalysts may appear desirable, but there is a trade-off. Various attempts have been made to balance these two apparently incompatible objectives, e.g. as summarized at Column 2, lines 1-57, and following, of my U.S. No. Pat. 4,968,405, which was issued on Nov. 6, 1990. Nonetheless, the problem is far from solved, and there remains a need for highly mesoporous highly attrition-resistant catalysts.

OBJECTS

It is, accordingly, a primary objective of the present invention to supply this need.

In particular, it is an object of this invention to provide a novel highly mesoporous catalytic cracking catalyst composition, particularly one of high mesoporosity which is highly attrition resistant when used in catalytic cracking operations, particularly a fluidized catalytic cracking operation.

A further and more specific object is to provide a novel FCC catalyst, and FCC process utilizing said FCC catalyst.

A yet further object is to provide a novel process for the preparation of highly mesoporous catalytic cracking catalysts, particularly catalytic cracking catalysts useful in fluidized catalytic cracking operations.

THE INVENTION

These objects and others are achieved in accordance with this invention which embodies, a novel catalytic cracking catalyst, process for the preparation of said novel catalytic cracking process, and fluidized catalytic cracking process which utilizes this catalyst to catalytically crack a hydrocarbon feed, at catalytic cracking conditions. The catalytic cracking catalyst is comprised of a matrix material constituted of from about 10 percent to about 50 percent, preferably from about 15 percent to about 30 percent, based on the total weight of the catalyst composition, within which is dispersed a crystalline aluminosilicate zeolite, or molecular sieve, natural or synthetic, typically one having a silica-to-alumina mole ratio ($Si/Al_2$) of about 2, and greater, and uniform pores with diameters ranging from about 4 Angstroms to about 15 Angstroms. The zeolite component content of the catalyst ranges from about 15 percent to about 80 percent, preferably from about 30 percent to about 60 percent, and more preferably from about 35 percent to about 55 percent, based on the total weight of the catalyst. The matrix material per se is formed from an admixture of (i) a silica sol made via an ion-exchange process, e.g. LUDOX (a trademark of E. I. DuPont), admixed or blended with (ii) an aluminum salt of a mineral acid, such as aluminum sulfate, aluminum chloride, or aluminum chlorhydrol, (iii) a silica sol made via reaction of sodium silicate, a mineral acid such as sulfuric acid or hydrochloric acid, and an aluminum salt solution, e.g. aluminum sulfate in water; and preferably also (iv) a clay component, or components, e.g. kaolin or montmorillonite, or both. The aluminum salt can be added after the silica sol made via an ion-exchange process, or with the silica sol made via reaction between sodium silicate, a mineral acid or an aluminum salt solution, or separately added in forming the admixture. The matrix material of the catalyst, after steaming, is characterized as having a pore size distribution, as measured by mercury porosimetry (*Structure of Metallic Catalysts*, J. R. Anderson. 1975, Chapter 6, Pages 384–385; $\theta = 140°$, Hg surface tension equals 474 ergs/cm$^2$), wherein of the pore volume measured between 45 Angstroms and 2000 Angstroms at least 75 percent, and preferably from about 80 percent to about 90 percent, of the pore sizes are greater than 160 Angstroms in diameter; and, more preferably, the matrix material is polymodal, one mode of which, after steaming, is characterized as having a pore size distribution, as measured by mercury porosimetry, wherein of the pore volume measured between 45 Angstroms and 2000 Angstroms at least 75 percent, and preferably from about 80 percent to about 90 percent, of the pore sizes are of diameter greater than 160 Angstroms, and a second mode wherein up to about 20 percent, and preferably from about 5 percent to about 10 percent, of the pore diameters are greater than 100 Angstroms, but less than 160 Angstroms in diameter.

A particularly preferred matrix material of the present invention is one which, after steaming, is characterized as of polymodal pore size distribution, especially a bimodal pore size distribution, as measured by mercury porosimetry. This matrix material is characterized as having a first mode of pore size distribution wherein at least about 75 percent, and preferably from about 80 percent to about 90 percent, of the pore volume measured between 45 Angstroms and 2000 Angstroms is in pores ranging between about 160 Angstroms and 400 Angstroms diameter, and more particularly between about 200 Angstroms and 250 Angstroms diameter. A second mode is of pore size distribution wherein up to about 20 percent, and preferably from about 5 percent to about 10 percent, of the pores are of diameter ranging between about 100 Angstroms and 160 Angstroms, and yet more preferably of diameter ranging between about 110 Angstroms and 150 Angstroms. Catalysts of these types are highly selective in the production of liquids, notably olefins, during fluid catalytic cracking operations, and coke make is low. The attrition resistance of these catalysts is quite low, ranging from about 1 to about 8, most often and preferably from about 1 to about 5 measured in terms of the Davison Index. See "Advances in Fluid Catalytic Cracking," *Catalytica*, Mountain View, Calif., Part 1, 1987. p. 355. This is sharply contrasted with the monodispersed, mesoporous catalysts made according to U.S. Pat. No. 4,968,405, the Davison Index of which rarely is less than 10, and generally ranges from about 10 to about 30.

In the utilization of this catalyst for catalytic cracking operations, temperatures range generally from about 750° F. to about 1300° F., preferably from about 900° F. to about 1050° F., and pressures from about 0 pound per square inch gauge, psig, to about 150 psig, preferably from about 1 psig to about 45 psig.

PREPARATION OF STARTING MATERIAL, OR CATALYST PRECURSOR MATERIAL

The catalyst of this invention is formed of an active crystalline aluminosilicate zeolite component, or components, dispersed in a mesoporous matrix constituted of the two different types of silica, and preferably the two different types of silica and one or more clay components. In brief compass, the crystalline aluminosilicate zeolite, or zeolite, suitably a USY or high silica USY zeolite, is admixed, preferably with a clay, e.g. kaolin or bentonite, or both kaolin and bentonite, and these solids slurried in a limited, and controlled amount of water. Two different types of silica sol are then added sequentially, (i) a silica sol made via an ion-exchange process and (ii) an acidic silica sol prepared by reaction of sodium silicate, an acid, and an aluminum salt. In a preferred preparation procedure, a silica sol made by an ion-exchange process is first added to an aqueous slurry of the zeolite and clay, or zeolite and admixture of clays, and this zeolite/clay/sol slurry is then added to the silica sol prepared by reaction of sodium silicate, acid and aluminum salt. An aluminum salt of a mineral acid, e.g. aluminum sulfate, is added either after the silica sol made via the ion-exchange process, or with the silica sol made via reaction between sodium silicate, a mineral acid and an aluminum salt solution, or separately, to the admixture. This slurry of blended components is dried, and then steamed to form the catalyst of this invention; a mesoporous catalyst with extraordinarily high mechanical strength, and attrition resistance, as well as a catalyst which is highly active and selective in the production of olefins, with low coke make.

Virtually any crystalline aluminosilicate zeolite having catalytic cracking activity can be used in the practice of this invention. Such zeolite materials are described in U.S. Pat. Nos. 3,660,274 and 3,944,482, both of which are incorporated herein by reference. Non-limiting examples of such zeolites, which can be employed in the practice of this invention, include both natural and synthetic zeolites. These zeolites include zeolites of the structural types included in the "Atlas of Zeolite Structural Types" edited by W. M. Meier and D. H. Olson and published by the Structure Commission of the International Zeolite Association in 1987 and also included herein by reference. Preferred are the faujasites, more preferred are zeolites X and Y, which are faujasite-type zeolites, and most preferred is zeolite Y. The term faujasite-type, as used therein, means those zeolites isostructural to faujasite.

Zeolites typically have silica to alumina mole ratios of (Si/Al$_2$) at least about 3 and uniform pore diameters from about 4 to 15 Angstroms. Zeolites as produced or found in nature normally contain an alkali metal cation, such as sodium and/or potassium and/or alkaline earth metal cation, such as magnesium and/or calcium. When used as a hydrocarbon cracking catalyst component, it is usually necessary to decrease the alkali metal content of the crystalline zeolite to less than about 5 wt. %, preferably less than about 1 wt. %, and more preferably less than about 0.5 wt. %. The alkali metal content reduction, as is known in the art, may be conducted by exchange with one or more cations selected from the Groups IB through VIII of the Periodic Table of Elements (the Periodic Table of Elements referred to herein is given in *Handbook of Chemistry and Physics*, published by the Chemical Rubber Publishing Company, Cleveland, Ohio 45th Edition, 1664), as well as with hydrogen cations or hydrogen precursors, e.g., $NH_4+$, capable of conversion to a hydrogen cation. Preferred cations include rare earths, calcium, magnesium, hydrogen and mixtures thereof. Ion exchange methods are well known in the art and are described, for example, in U.S. Pat. No. 3,140,249; U.S. Pat. No. 3,142,251 and U.S. Pat. No. 1,423,353, the teachings of which are hereby incorporated by reference. The concentration of the hydrogen cation in the finished catalyst is the difference between the theoretical exchange capacity of the particular zeolite and the number of equivalents of rare earths, alkaline earths, and alkali metals actually present. The particle size of the zeolite component may range from about 0.1 to 10 microns preferably from about 0.5 to 3 microns. The amounts of zeolite component in the total catalyst will generally range from about 15 percent to about 80 percent, preferably from about 30 percent to about 60 percent, more preferably from about 35 percent to about 55 percent based on the total weight of catalyst. The silica:alumina weight ratio of the catalyst ranges from about 2:1 to about 6:1, preferably from about 3:1 to about 5:1.

In a first step of the catalyst preparation procedure, zeolite, or one or more clays and zeolite are added together or in sequence, in any order, and slurried at ambient temperature in a limited, controlled, and critical amount of water. In general, it has been found that the weight ratio of water:solids in the slurry can range between about 0.5:1 to about 2:1, preferably between about 0.7:1 to about 1.5:1. A weight ratio of water:solids approximating about 1:1 has been found highly successful in forming high quality catalysts. When the weight ratio of water:solids is less than about 0.5:1, the viscosity of the slurry is too high to spray dry, and when the weight ratio of water:solids exceeds about 2:1 the attrition-resistance of the catalyst is poor. The clay component added to, or slurried with the zeolite is typically a naturally occurring, relatively nonporous clay such as kaolin, bentonite, hectorite, sepiolite, attapulgite, montmorillonite, halloysite or the like. The pH of the slurry at this time ranges between about 4 and about 10; and the addition of the clay to the slurry does not significantly alter the pH of the slurry, if at all.

In a second step, a silica sol obtained or derived from an ion-exchange process is added to the previously prepared zeolite, or zeolite/clay(s) slurry. The silica sol is one of controlled particle size; the particles of silica ranging from about 4.0 nm (nanometers) to about 22.0 nm, preferably from about 10.0 nm to about 15.0 nm average diameter. (*The Chemistry of Silica: Solubility, Polymerization, Colloid And Surface Properties, And Biochemistry* by Ralph K. Iler. A Wiley Interscience Publication, 1979.) Thus, a monodispersed colloidal silica, or silica of controlled particle size, derived from an ion-exchange process, e.g. LUDOX, is added to the zeolite/clay(s) slurry, if necessary with enough additional water to maintain the water:solids weight ratio between about 0.5:1 and 2:1, preferably about 0.7:1 to 1.5:1, and the mixture thoroughly stirred to abrade and eliminate crumbs. Suitably, the slurry is admixed and abraded on a colloid mill to produce particles ranging in size from about 1-3 microns. The pH of the slurry at this time is about neutral, or ranges generally between about 4 and 10.

Silica sols suitable for use in the present invention are any of those derived from an ion-exchange process which have a substantially uniform particle size within the range of about 20 to 400 Angstroms. The term, substantially uniform, as used herein with respect to the particle size means that at least 80%, preferably at least 90%, of the particles have a particle size from about 0.5 D to 1.5 D, where D is the median particle diameter. It is preferred that the silica sols used herein have spheroid particle shapes. These silica sols can be prepared by any conventional method in the art and examples can be found in *The Chemistry of Silica: Solubility, Polymerization, Colloid and Surface Properties, and Biochemistry* by Ralph K. Iler, John Wiley and Sons, New York, 1979. Monodispersed silica sols are available commercially under such trade names as LUDOX from E.I. DuPont de Nemours & Co., Inc., NALCOAG from Nalco Chemical Company, and NYACOL from PQ Corporation.

An aluminum salt, e.g. aluminum sulfate, can be added to the admixture subsequently to the silica sol derived from the ion-exchange process.

In the next, or third step, a second type of silica sol prepared by the reaction of a sodium silicate solution and a solution of a mineral acid and the salt of a mineral acid, as e.g. a solution of sulfuric acid and aluminum sulfate, with an aluminum salt, unless the aluminum salt has been previously added, is blended with the zeolite/clay(s)/silica sol slurry, additionally adding water if necessary to maintain the water:solids ratio between about 0.5:1 to 2:1, preferably about 0.7:1 to 1.5:1. A sufficient amount of the acid silica sol is added to adjust the pH within a range of from about 2 to 5, preferably from about 2.5 to about 4.5. The density of the slurry, on completing the addition of the acid silica sol, preferably ranges from about 1.16 to about 1.25, and more preferably from about 1.18 to about 1.22. Preferably also, the viscosity of the slurry at this time ranges from about 1.0 to about 20 centistokes (cSt), more preferably from about 1.2 to about 2.0 cSt.

After blending the acid silica sol, and aluminum salt, with the zeolite/clay(s)/silica sol slurry, with adjustment of the water content, density, and preferably also the viscosity, the slurry, now containing all essential components, is now ready for feeding to a spray drier to form spherical particles.

FINAL PREPARATION OF CATALYST

In a fourth step, the slurry suitably at/or below ambient temperature is fed to a drier, preferably a spray drier, at a temperature sufficient to remove the water and form micro spheres of average particle diameter ranging from about 10 microns to about 200 microns, preferably from about 60 microns to about 100 microns. The temperature is sufficiently high to dry the slurry and form a rigid structure, but insufficiently high as to cause alkali metal components to be occluded within the zeolite and prevent it from being washed, ion-exchanged, and removed from the zeolite. Typically, the slurry is fed to a drier, preferably a spray drier at an average inlet temperature ranging from about 250° C. to about 350° C., and an outlet temperature ranging from about 125° C. to about 225° C. Surprisingly, the mesoporosity of the matrix material, and mechanical strength of the catalyst, is dependent on the amount of water contained in the slurry. It is essential that the water:solids content of the slurry range between about 0.5:1 to about 2:1, preferably from about 0.7:1 to about 1.5:1, and the density of the slurry be greater than 1.16 g/cc, and preferably greater than 1.18 g/cc to form catalysts of this invention.

In a fifth step, the particles of microspherical shape are washed with ionized water, e.g. at about 120° F., and ion-exchanged by contact with an ammonium salt solution of a strong acid for a time sufficient to remove the alkali metal, e.g. sodium, from the zeolite. Exemplary of ammonium salts which can be used in solution for this purpose are ammonium sulfate, ammonium chloride, ammonium nitrate and the like. The ion-exchanged particles are generally again washed, e.g. at about 120° F. Typically, the zeolite portion of the catalyst, after ion-exchange, and washing, contains less than about 1.0 percent alkali metal, and generally less than about 0.5 percent of the alkali metal. The non-zeolitic portion of the pre-catalyst, or matrix, prior to steaming, contains pores of bimodal distribution; a distribution which after steaming is shifted to pore distributions, as measured by mercury porosimetry, wherein at least 75 percent, and preferably from about 80 percent to about 90 percent, of the pore volume between 45 Angstroms and 2000 Angstroms is in pores of diameter greater than 160 Angstroms. Generally, and preferably, after steaming, the pore distribution of the matrix material is polymodal wherein, of the pore volume measured between 45 Angstroms and 2000 Angstroms, a first mode of which is characterized as having at least about 75 percent, and preferably from about 80 percent to about 90 percent, pore sizes greater than 160 Angstroms in diameter, and a second mode wherein up to 20 percent, and preferably from about 5 percent to about 10 percent, of the pore sizes are greater than 100 Angstroms in diameter, but less than 160 Angstroms in diameter. In its most preferred aspects the matrix material, after steaming, is bimodal and is characterized as having a first mode wherein at least about 75 percent, preferably from about 80 percent to about 90 percent, of the pore volume between 45 Angstroms and 2000 Angstroms is in pores greater than 160 Angstroms diameter, and more particularly the pores are of diameter ranging between about 160 Angstroms and 400 Angstroms diameter, more particularly between about 200 Angstroms and 250 Angstroms diameter, and a second mode wherein up to than about 20 percent, and preferably up to about 10 percent of the pores are of diameter exceeding 100 Angstroms diameter. Generally, and preferably at least about 5 percent, more preferably from about 5 percent to about 10 percent, of the pores are of a size distribution ranging between about 100 Angstroms and 160 Angstroms, preferably between about 110 Angstroms and 150 Angstroms. These measurements are taken after steaming the particles at 760° C. for a period of sixteen hours.

CATALYTIC CRACKING OPERATION

In conducting the catalytic cracking operation, utilizing the catalyst of this invention, the temperature employed ranges from about 750° F. to about 1300° F., preferably from about 900° F. to about 1050° F., and the pressure employed is one ranging from about 0 psig to about 150 psig, preferably from about 1 psig to about 45 psig. Suitably, catalyst to oil ratios in the cracking zone used to convert the feed to lower boiling products are not more than about 30:1, and may range from about 20:1 to about 2:1, preferably from about 4:1 to about 9:1. The catalytic cracking process may be carried out in a fixed bed, moving bed, ebullated bed, slurry, transfer line (dispersed phase) or fluidized bed operation. Suitable regeneration temperatures include a temperature ranging from about 1100° to about 1500° F., and a pressure ranging from about 0 to about 150 psig. The oxidizing agent used to contact the partially deactivated (i.e., coked) catalyst will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

Suitable hydrocarbonaceous feeds for the catalytic cracking process of the present invention include naphtha, hydrocarbonaceous oils boiling in the range of about 430° F. to about 1050° F., such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, and mixtures thereof.

REFERENCE TO THE FIGURES

Reference is made to the attached figures. The figures are graphical representations of data presented hereafter on catalyst preparations, either examples or demonstrations. In the figures pore diameter distribution, in Angstroms, is represented on the x-axis. The dV/dD (ccHg×10 exp 4/g−A) of a given catalyst specimen is represented on the y-axis.

FIG. 2AB depicts the pore size distributions, on the same graph, of both the steamed and unsteamed catalyst specimens of Example 2.

FIG. 2CD depicts the pore size distributions, on the same graph, of both the steamed and unsteamed catalyst specimens of Demonstration 2.

FIG. 3 AB depicts the pore size distributions of both the steamed and unsteamed catalyst specimens of Demonstration 3; and FIG. 4AB depicts the pore size distributions of both the steamed and unsteamed catalyst specimens of Demonstration 4.

The invention, and its principle and mode of operation will be more fully understood by reference to the following examples, comparative runs and illustrative data, illustrating its more salient features. All units are given in terms of weight except as otherwise expressed.

WORKING EXAMPLES

The catalytic performance of catalysts of this invention were compared with catalysts prepared in accordance with the teachings of U.S. Pat. No. 4,968,405, U.S. Pat. No. 4,987,110 and with commercial catalysts, using a modified microactivity test (MAT) with a standard feed whose properties are given below. In this test, 2 cc of feed is injected over 5 gm of catalysts at a temperature of 482° C. over a period of 80 seconds. The conversion of feed to products which boil less than 220° C. is determined together with the coke and hydrogen yields. In order to allow a comparison between catalysts which produce different conversions, the coke yield and hydrogen yield are divided by a conversion function $[x/(1-x)]$ in which x is the conversion from the 220° C.-fbp of the feed. These "normalized" coke and hydrogen yields are called the "specific coke" and the "specific hydrogen" respectively and allow comparison between catalysts of somewhat different activities.

| Feedstock | |
|---|---|
| API Gravity (°) | 22.5 |
| Sulfur (Wt %) | 1.15 |
| Refractive Index | 1.4928 |
| Aniline Point | 179 |
| Total Nitrogen (Wt %) | 0.063 |
| Pour Point, °F. | 95 |
| Hivac C, °C. 10/50/90 LV % | 400/456/519 |

The macroporosity of the catalysts of this invention prior to steaming are characterized as having a pore size distribution such that more than 20 percent, and most often more than 35 percent of the matrix porosity, as measured by mercury porosimetry, lies below 160 Angstroms. Generally, the pore size distribution prior to steaming is monomodal. From about 20 percent to about 40 percent, and most often from about 25 percent to about 35 percent, of the largest pores of the unsteamed matrix material is of pore size ranging between about 80 Angstroms and about 160 Angstroms, and the attrition resistance of these catalysts is good. After steaming at 1400° F. for sixteen hours, the pore size distribution is shifted and the pores are increased in size. After steaming, at least 75 percent, and most often and preferably from about 80 percent to about 90 percent of the pores are of diameter greater than 160 Angstroms. Generally, and preferably, after steaming, the pore distribution of the matrix material is polymodal wherein, of the pore volume measured between 45 Angstroms and 2000 Angstroms, a first mode of which is characterized as having at least about 75 percent, and preferably from about 80 percent to about 90 percent, pore sizes greater than 160 Angstroms in diameter, and a second mode wherein up to about 20 percent, and preferably from about 5 percent to about 10 percent, of the pore sizes are greater than 100 Angstroms in diameter, but less than 160 Angstroms in diameter. In its most preferred aspects the matrix material, after the catalyst is steamed, is characterized as having a first mode wherein at least about 75 percent, preferably from about 80 percent to about 90 percent, of the pore volume between 45 Angstroms and 2000 Angstroms is in pores greater than 160 Angstroms diameter, and more particularly the pores are of diameter ranging between about 160 Angstroms and 400 Angstroms diameter, preferably about 200 Angstroms and 250 Angstroms diameter, and a second mode wherein at least about 5 percent, preferably from about 5 percent to about 10 percent, of the pores are of a size distribution ranging between about 100 Angstroms and 160 Angstroms, preferably between about 110 Angstroms and 150 Angstroms.

A maximum in a dV/dD plot, for particles of this invention lies above 160 Angstroms, where dV is the incremental intrusion volume of the mercury in a porosimeter in cc/g and dD is the change in pore diameter. D (the diameter of the pore) is given by $(4y \cos \Theta)/p$ where y is the surface tension of mercury (474 dynes/cm), $\Theta$ is the assumed contact angle between mercury and the catalyst surface of 140° and p is the pressure.

The following example describes the preparation of a catalyst which, when steamed, forms a bimodal mesoporous pore structure between 10 nm and 60 nm, and the mode which lies above 16 nm has a value for dV/dD as measured by mercury intrusion which is greater than 10. The catalyst is made by using colloidal silica particles of 12 nm diameter. The particle size of the pore formed by these particles is greater than 20 nm, a surprising feature since, generally, in prior art catalyst preparation procedures pore size is usually less than twice the particle size.

EXAMPLE 1

Catalyst No. EX1

9.01 lbs. (0.888 solids) of Z-14G, an ultrastable faujasite (Davison) having a $SiO_2:Al_2O_3$ molar ratio of 6:1 and pore size opening of 8 Angstroms, 4.0 lbs. of Hydrite UF Kaolin Clay (Georgia Kaolin) and 0.2 lb. of HPM20 bentonite clay (American Colloid) were mixed together dry and then dispersed in 12.0 lbs. of water and 8.0 lbs. of LUDOX HS-40 (DuPont) with a colloid mill and then added to a pump-around system.

After dissolving 5.22 lbs. of aluminum sulfate pentadecahydrate in 10.0 lbs. of $H_2O$, the solution was added to the pump around.

Finally, a 4 lbs. dry weight batch of an acid alum/-silica sol (6% $Al_2O_3$/94% $SiO_2$) was prepared by reacting 30 lbs. of a 1.2% $SiO_2$ solution (prepared by reacting 12.7 lbs. of "N" brand sodium silicate (PQ Corporation) dissolved in 17.3 lbs. of water with 9.1 lbs. of a solution containing 12.4%, 98% suluric acid and 17.5% aluminum sulfate pentadecahydrate) in a mixer such that the pH did not rise above 3.4. One-fourth of this batch of sols (ca. 10 lbs.) was added instantaneously and immediately to the pump around. The balance was then pumped in at ca. 1.0 liters/min.

The pH of the catalyst slurry was 3.4.

The density of the slurry was 1.19 g/cc.

The viscosity of the slurry was 1.1 cSt.

The slurry was spray dried at a 550° F. inlet temperature, and a 350° F. outlet temperature through a nozzle rotating at 15,000 rpm.

9.6 lbs. of product was collected from the primary cyclone and 3.1 lbs. of product was collected from the secondary cyclone.

4000 g of deionized water was pumped through two fluidized beds containing 250 g each of the dried catalyst. The beds were maintained at a temperature of 80° C. during the wash and subsequent ion-exchange and washing procedures.

Then, 4000 g of ammoniated 12% ammonium sulfate solution was pumped through each of the 250 g batches, or beds of catalyst at 80° C. in the fluidized bed ion exchanger to ion-exchange the sodium ions in the catalyst with ammonium ions.

Finally, 8000 g of deionized water was pumped through each 250 g batch of the catalyst. The catalyst batches the calcined at 550° C. for 2 hours to give:
71 g of EX1.1A1 (underflow 1st batch)
100 of EX1.1C1 (overflow 1st batch)
82 g of EX1.1A2 (underflow 2nd batch)
83 g of EX1.1C2 (overflow 2nd batch)
EX1.1A1 was combined with EX1.1A2 to give EX-1.1A.
EX1.1C1 was combined with EX1.1C2 to give EX.1.1C.

A second set of ion-exchanged catalysts was also made.

4000 g of deionized water was pumped through two fluidized beds containing 250 g each of the dried catalyst. The beds were maintained at a temperature of 80° C. during the wash and subsequent ion-exchange procedures.

Then 4000 g of ammoniated 12% ammonium sulfate solution was pumped through each 250 g batch of the catalyst at 80° C. in the fluidized bed ion exchanger to ion-exchange the sodium ions in the catalyst with ammonium ions.

Finally, 8000 g of deionized water was pumped through each 250 g batch of the catalyst. The catalyst batches were then calcined at 550° C. for 2 hours to give:
88 g of EX1.2A1 (underflow 1st batch)
66 g of EX1.2C1 (overflow 1st batch)
77 g of EX1.2A2 (underflow 2nd batch)
59 g of EX1.2C2 (overflow 2nd batch)
EX1.2A1 was combined with EX1.2A2 to give EX1.2A.
EX1.2C1 was combined with EX1.2C2 to give EX1.2C.
EX1.1A, EX1.1C, EX1.2A, and EX1.2C were steamed at 760° C. for 14 hours to give EX1.1B, EX1.1D, EX1.2B, and EX1.2D respectively.

| Catalyst No. | Attrition (DI) | Na Wt % | Silica Wt % | Alumina Wt % | Surface Area m²/g | Pore Volume ml/g | Unit Cell Ang. | Rel. % Crystallinity |
|---|---|---|---|---|---|---|---|---|
| EX1.1A | 4.5 | 0.05 | N/A | N/A | 339 | 0.32 | 24.43 | 37 |
| EX1.1C | 2.9 | 0.05 | N/A | N/A | 336 | 0.331 | 24.4 | 39 |
| EX1.2A | 2.6 | 0.2 | N/A | N/A | 309 | 0.294 | 24.47 | 27 |
| EX1.2C | 4.0 | 0.17 | 81.00 | 17.73 | 311 | 0.292 | 24.45 | 34 |

| Catalyst No. | Attrition (DI) | Surface Area m²/g | Pore Volume ml/g | Unit Cell Ang. | Rel. % Crystallinity |
|---|---|---|---|---|---|
| EX1.1B | 5.5 | 197 | 0.259 | 24.49 | 28 |
| EX1.1D | 6.9 | 202 | 0.259 | 24.23 | 27 |
| EX1.2B | 6.4 | 181 | 0.232 | 24.23 | 31 |
| EX1.2D | 6.2 | 187 | 0.229 | 24.22 | 33 |
| EX1.3B |  | 202 | 0.253 | 24.26 | 28 |

EX1.3B was prepared by pumping 200 lbs. of water at 74° C. followed by 105 lbs of 5% ammonium sulfate solution followed by 130 lbs. of water through 10 lbs. of the spray-dried catalyst. The product was dried, calcined at 1000° F., and steamed at 760° C. for 16 hours to give EX1.3B.

The catalysts derived from EX1, the catalysts of this invention, have superior attrition properties as contrasted with conventional catalysts and catalysts prepared in Demonstrations 1 and 2, which follow. Further, as demonstrated by the MAT test, they are shown to have superior olefin selectivity relative to catalysts prepared in Demonstrations 1 and 2, as reflected by higher $C_3$ olefin/paraffin ratios, $C_3O/P$, for Example 1 and Example 2 relative to Demonstration 1 and Demonstration 2, and do not produce large amounts of coke. The matrices of the catalysts of this invention typically show a dV/dD plot wherein a large amount of the pore distribution lies above 160 Angstroms where dV is the incremental intrusion volume of the mercury in the porosimeter in cc/g and dD is the change in pore diameter. D (the diameter of the pore) is given by $(4y \cos \theta)/p$ where y is the surface tension of mercury, $\theta$ is the assumed contact angle between mercury and the surface of 140° and p is the pressure.

| Catalyst No. | Raw MAT | MAT $H_2$ Yield, Wt % | MAT C Yield, Wt % | MAT $C_3O/P$ Ratio | MAT Specific Hydrogen | MAT Specific Coke |
|---|---|---|---|---|---|---|
| EX1.2D | 69.0 | 0.0286 | 1.82 | 5.66 | .013 | 0.82 |
| EX1.2D | 72.3 | 0.0305 | 1.96 | 5.13 | .012 | 0.75 |
| EX1.1D | 72.6 | 0.0289 | 2.12 | 5.25 | .011 | 0.80 |
| EX1.2B | 72.8 | 0.0351 | 1.79 | 5.08 | .013 | 0.67 |
| EX1.1B | 74.0 | 0.03 | 2.27 | 5.23 | .011 | 0.80 |
| EX1.1D | 74.1 | 0.0311 | 2.12 | 5.42 | .011 | 0.74 |
| EX1.2B | 78.6 | 0.0746 | 2.72 | 3.36 | .020 | 0.74 |
| EX1.1B | 79.2 | 0.0211 | 3.52 | 3.07 | .006 | 0.93 |
| EX1.3B | 65.9 | 0.0314 | 1.545 | 5.4 | 0.016 | 0.80 |
| EX1.3B | 69.5 | 0.0303 | 1.629 | 5.48 | 0.013 | 0.71 |
| EX1.3B | 71.3 | 0.0361 | 2.018 | 4.69 | 0.015 | 0.81 |
| EX1.3B | 73.6 | 0.042 | 2.033 | 4.38 | 0.015 | 0.73 |
| EX1.3B | 76.6 | 0.0525 | 2.779 | 3.74 | 0.016 | 0.85 |
| EX1.3B | 78 | 0.0509 | 2.816 | 3.78 | 0.014 | 0.79 |

Figure 1A:
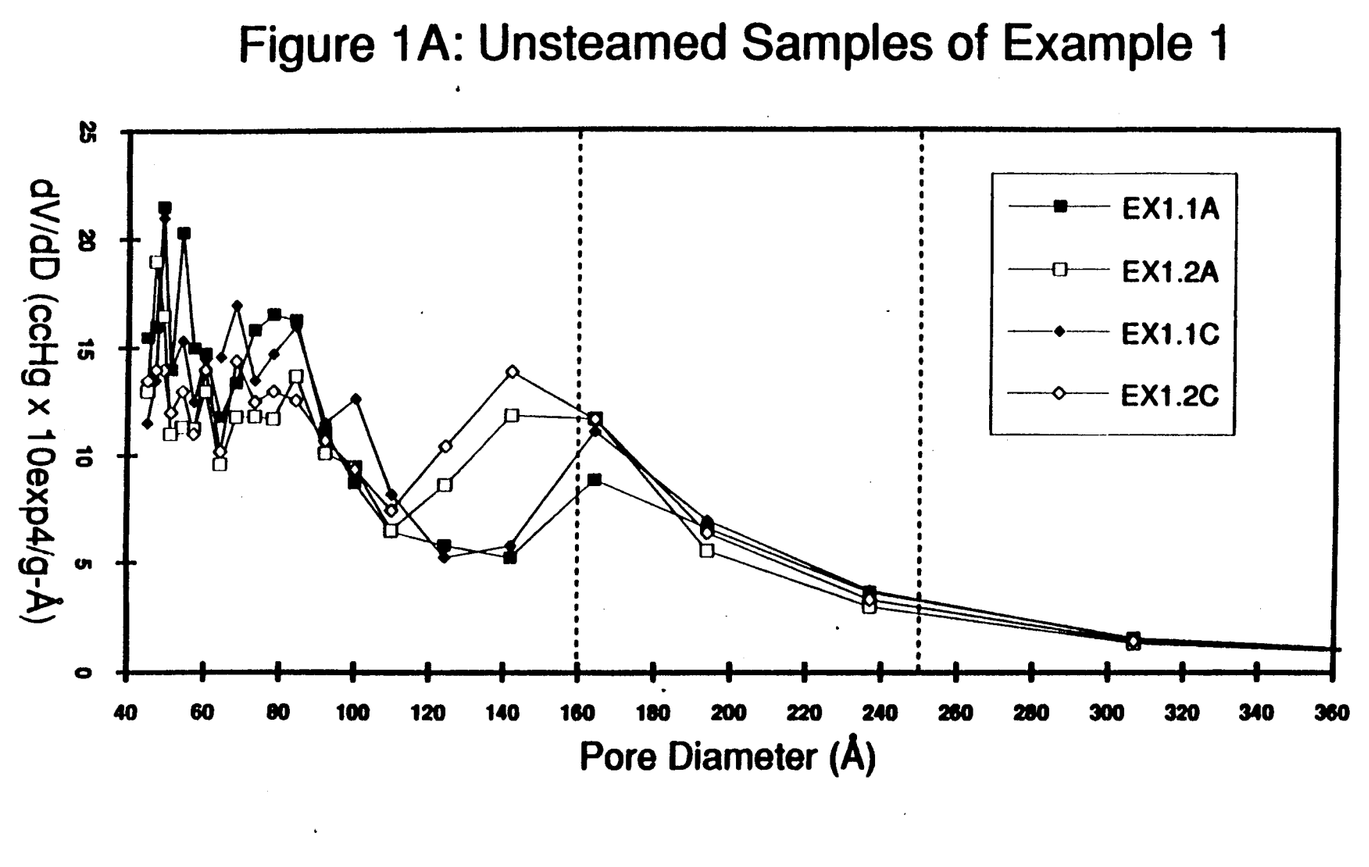
FIG. 1A depicts the pore size distribution of the unsteamed catalyst specimens of Example 1.
Figure 1B:
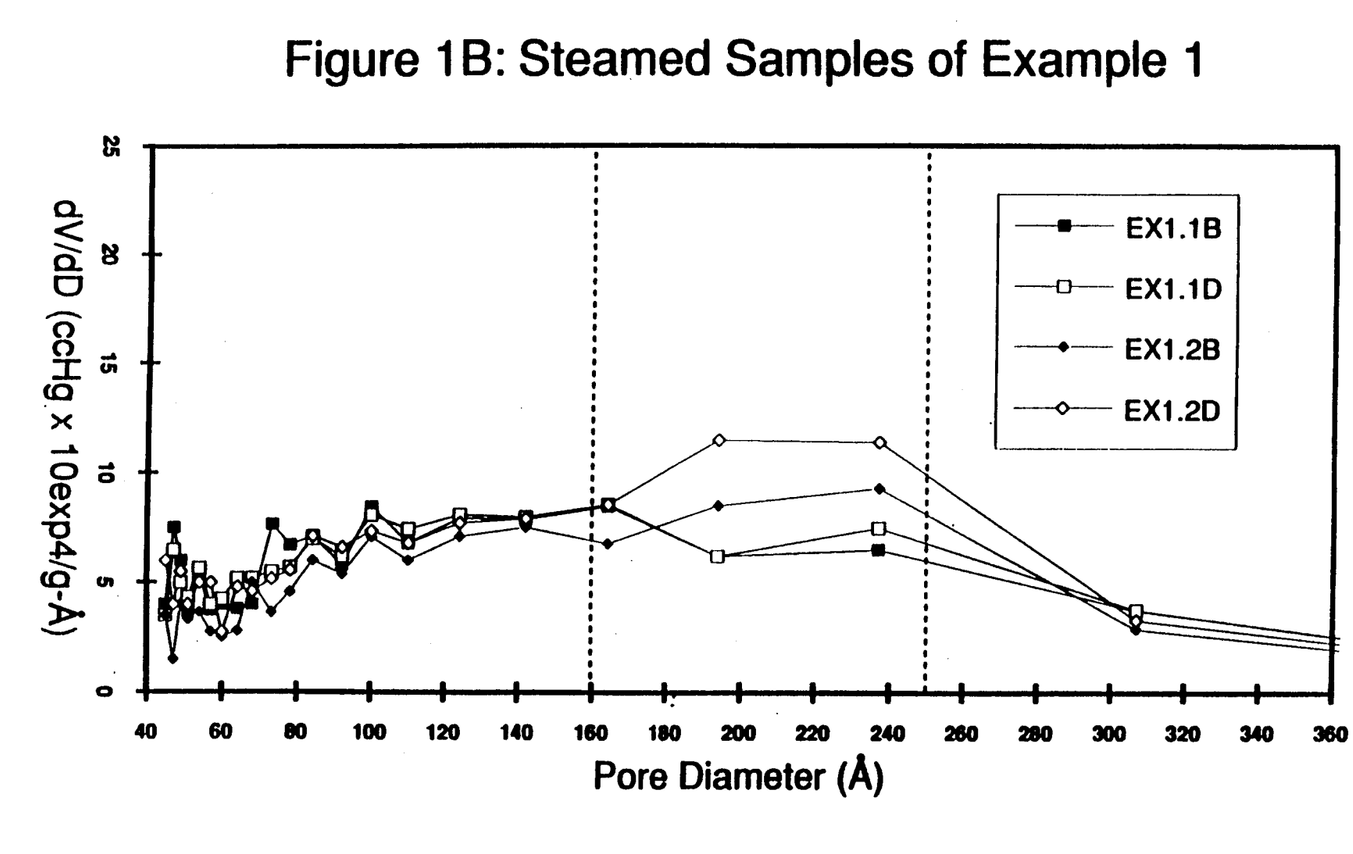
FIG. 1B depicts the pore size distribution of the steamed catalysts of Example 1.

The salient features of these data presented in this Example 1 are graphically illustrated by further reference to FIGS. 1A and 1B. FIG. 1A graphically illustrates the unsteamed catalyst precursor, and FIG. 1B the steamed catalyst, or catalyst of this invention. As is quite apparent from the data, a relatively small number of pores of diameter greater than 15.8 nm are contained in the catalyst precursor. However, after steaming, the number of pores of diameter greater than 16 nm is greatly increased; while the number of pores of smaller diameter is greatly decreased. Indeed, the porosity of the matrix portion of the steamed catalyst is shifted, with the pore size distribution of the catalyst becoming essentially bimodal.

DEMONSTRATION 1: CATALYST NO. DM1

The following for purposes of comparison describes the preparation and testing of a catalyst not of this invention, albeit a catalyst made from the same components in the same proportions. The procedure employed in the preparation of this catalyst differed from that employed to make the catalysts of this invention in that the solids content of the slurry was too low to form a catalyst of good pore structure.

9.01 lbs. (0.888 solids) of Z-14G (Davison), an ultrastable Y zeolite, 4.0 lbs. of Hydrite UF kaolin clay (Georgia Kaolin) and 0.2 lb. of HPM20 bentonite clay were mixed together dry and then dispersed in 26 lbs. of water with a colloid mill and added to a pump-around system.

After dissolving 5.22 lbs. of aluminum sulfate pentadecahydrate in 10.0 lbs. of $H_2O$, the solution was added to the pump around.

Finally 4 lbs. dry weight of an acid alum/silica sol (6% $Al_2O_3$/94% $SiO_2$) was prepared by reacting 30 lbs. of a 12.2% $SiO_2$ solution prepared by reacting 12.7 lbs. of "N" brand sodium silicate dissolved in 17.3 lbs. of water with 9.1 lbs. of a solution containing 12.4% 98% sulfuric acid and 17.6% aluminum sulfate pentadecahydrate in a rapid mixer such that the pH did not rise above 3.4. This sol was added instantaneously and immediately to the pump around.

The pH of the catalyst slurry was 3.1.
The density of the slurry was 1.15 g/cc.
The viscosity of the slurry was 1.0 cSt.
The slurry was spray dried at 550° F. inlet temperature, 350° F. outlet temperature, through a nozzle rotating at 15,000 rpm.

9.8 lbs. of product was collected from the primary cyclone and 2.4 lbs. of product was collected from the secondary cyclone.

4000 g of deionized water was pumped over two fluidized beds of 250 g each of the dried catalyst. The beds were maintained at a temperature of 80° C. during this wash and the subsequent ion-exchange and washing procedures.

Then, 4000 g of ammoniated 12% ammonium sulfate solution was pumped over each two 250 g batch of the catalyst at 80° C. in the fluidized bed ion exchanger.

Finally, 800 g of deionized water was pumped through each 250 g batch of the catalyst. The catalyst batches were then calcined at 550° C. for 2 hours to give:

104 g of DM1.1A (underflow 1st batch)
68 g of DM1.1C (overflow 1st batch)
107 g of DM1.2A (underflow 2nd batch)
64 g DM1.2C (overflow 2nd batch)

| Catalyst No. | Attrition | Na Wt % | Silica Wt % | Alumina Wt % | Surface Area $m^2/g$ | Pore Volume ml/g | Unit Cell Ang. | Rel. % Crystallinity |
|---|---|---|---|---|---|---|---|---|
| DM1.1A | 10.5 | 0.06 | 80.9 | 18.26 | 356 | 0.316 | 24.48 | 38 |
| DM1.1C | 8.1 | 0.18 | 80.4 | 18.2 | 342 | 0.292 | 24.41 | 34 |
| DM1.2A | 9.9 | 0.08 | 79.95 | 18.26 | 352 | 0.317 | 24.45 | 32 |
| DM1.2C | 7.4 | 0.15 | | 18.19 | 339 | 0.288 | 24.42 | 32 |

DM1.1A, DM1.1C, DM1.2A, and DM1.2C were steamed at 760° C. for 16 hours to give DM1.1B, DM1.1D, DM1.2B, and DM1.2D, respectively.

About 10 lbs. of the spray dried catalyst was exchanged in an alternate fashion at 50° C. It was first slurried with 75 lbs. of 0.03% $NH_3$ solution, then rinsed with two (2) 16 lb. batches of water, then rinsed with three (3) 8 lb. batches of 3.3% ammonium sulfate solution, then rinsed with two (2) 16 lb. batches of water, then slurried with 40 lbs. of 3.3% ammonium sulfate, then rinsed with two (2) 16 lb. batches of water, then rinsed with one (1) 10 lb. batch of 3.3% ammonium sulfate, then reslurried in 60 lbs. of water and rinsed with five (5) 16 lb. batches of water. This material was called DM1.3A after steaming at 760° C. for 16 hours. It was steamed an additional 8 hours at 760° C. and called DM1.3B. As seen in the following table the steamed DM1.3A and DM1.3B had very similar physical properties to those of DM1.1-DM1.2 catalysts.

| Catalyst No. | Na Wt % | Surface Area $m^2/g$ | Pore Volume ml/g | Unit Cell Ang. | Rel. % Crystallinity |
|---|---|---|---|---|---|
| DM1.1B | 0.06 | 223 | 0.286 | 24.25 | 32 |
| DM1.1D | | 218 | 0.228 | | |
| DM1.2B | 0.06 | 222 | 0.275 | 24.23 | 31 |
| DM1.2D | | 211 | 0.231 | | |
| DM1.3A | 0.06 | 229 | 0.233 | 24.24 | 26 |
| DM1.3B | 0.06 | 213 | 0.219 | 24.23 | 30 |

The following data shows that the selectivity of DM1 catalysts was consistent from batch to batch.

| Catalyst No. | Raw MAT | MAT $H_2$ Yield, Wt. % | MAT C Yield, Wt. % | MAT Cat/Oil | MAT $C_3O/P$ Ratio | MAT Specific Hydrogen | MAT Specific Coke |
|---|---|---|---|---|---|---|---|
| DM1.1B | 72.5 | 0.0369 | 2.3169 | 2.76 | 5.9 | 0.014 | 0.88 |
| DM1.1D | 73.9 | 0.0339 | 2.3753 | 2.76 | 4.93 | 0.012 | 0.84 |
| DM1.1D | 72.8 | 0.0333 | 2.574 | 2.76 | 4.42 | 0.012 | 0.96 |
| DM1.2B | 73.9 | 0.0316 | 2.5669 | 2.76 | 4.91 | 0.011 | 0.91 |
| DM1.2B | 75.9 | 0.035 | 2.5872 | 2.76 | 4.69 | 0.011 | 0.82 |
| DM1.2D | 73.4 | 0.0245 | 2.2999 | 2.76 | N/A | 0.009 | 0.83 |
| DM1.2D | 74.3 | 0.0388 | 2.4938 | 2.76 | 4.37 | 0.013 | 0.86 |
| DM1.3A | 57.4 | 0.041 | 1.5359 | 1.65 | 4.72 | 0.03 | 1.14 |
| DM1.3A | 61.1 | 0.0309 | 1.6357 | 1.65 | 4.72 | 0.02 | 1.04 |
| DM1.3A | 73.4 | 0.0477 | 2.8203 | 2.76 | 3.72 | 0.017 | 1.02 |
| DM1.3A | 73.4 | 0.0309 | 2.4889 | 2.76 | 3.56 | 0.011 | 0.9 |
| DM1.3A | 73.8 | 0.0323 | 2.6165 | 2.76 | 3.62 | 0.011 | 0.93 |
| DM1.3A | 75.2 | 0.0463 | 2.975 | 2.76 | 3.42 | 0.015 | 0.98 |
| DM1.3A | 75.5 | 0.0453 | 2.5882 | 2.78 | 3.78 | 0.015 | 0.84 |
| DM1.3A | 76.5 | 0.0596 | 2.8283 | 2.76 | 3.78 | 0.018 | 0.87 |
| DM1.3A | 79 | 0.0549 | 4.0447 | 3.89 | 2.64 | 0.015 | 1.08 |
| DM1.3A | 79.1 | 0.0566 | 4.0594 | 3.87 | 2.56 | 0.015 | 1.07 |
| DM1.3A | 83.4 | 0.0805 | 6.5065 | 5.56 | 1.43 | 0.016 | 1.3 |

-continued

| Catalyst No. | Raw MAT | MAT H₂ Yield, Wt % | MAT C Yield, Wt % | MAT C₃O/P Ratio | MAT Specific Hydrogen | MAT Specific Coke |
| --- | --- | --- | --- | --- | --- | --- |
| DM1.3A | 84.4 | 0.085 | 6.3 | 5.52 | 1.41 | 0.016 | 1.16 |
| DM1.3B | 65.7 | 0.0344 | 2.3035 | 6.14 | 0.018 | 1.2 |
| DM1.3B | 68.3 | 0.039 | 2.1553 | 5.8 | 0.018 | 1 |
| DM1.3B | 69.4 | 0.038 | 1.9646 | 5.98 | 0.017 | 0.87 |
| DM1.3B | 70.5 | 0.0413 | 2.2993 | 5.84 | 0.017 | 0.96 |
| DM1.3B | 71.5 | 0.0438 | 2.4936 | 5.83 | 0.017 | 0.99 |
| DM1.3B | 71.8 | 0.04 | 2.3251 | 5.99 | 0.016 | 0.91 |
| DM1.3B | 75.3 | 0.0479 | 3.2271 | 4.81 | 0.016 | 1.06 |
| DM1.3B | 76.1 | 0.0474 | 3.6704 | 4.64 | 0.015 | 1.15 |
| DM1.3B | 80.1 | 0.0648 | 4.8724 | 2.79 | 0.016 | 1.21 |
| DM1.3B | 81.5 | 0.0673 | 5.22 | 2.7 | 0.015 | 1.18 |

Figure 1C:
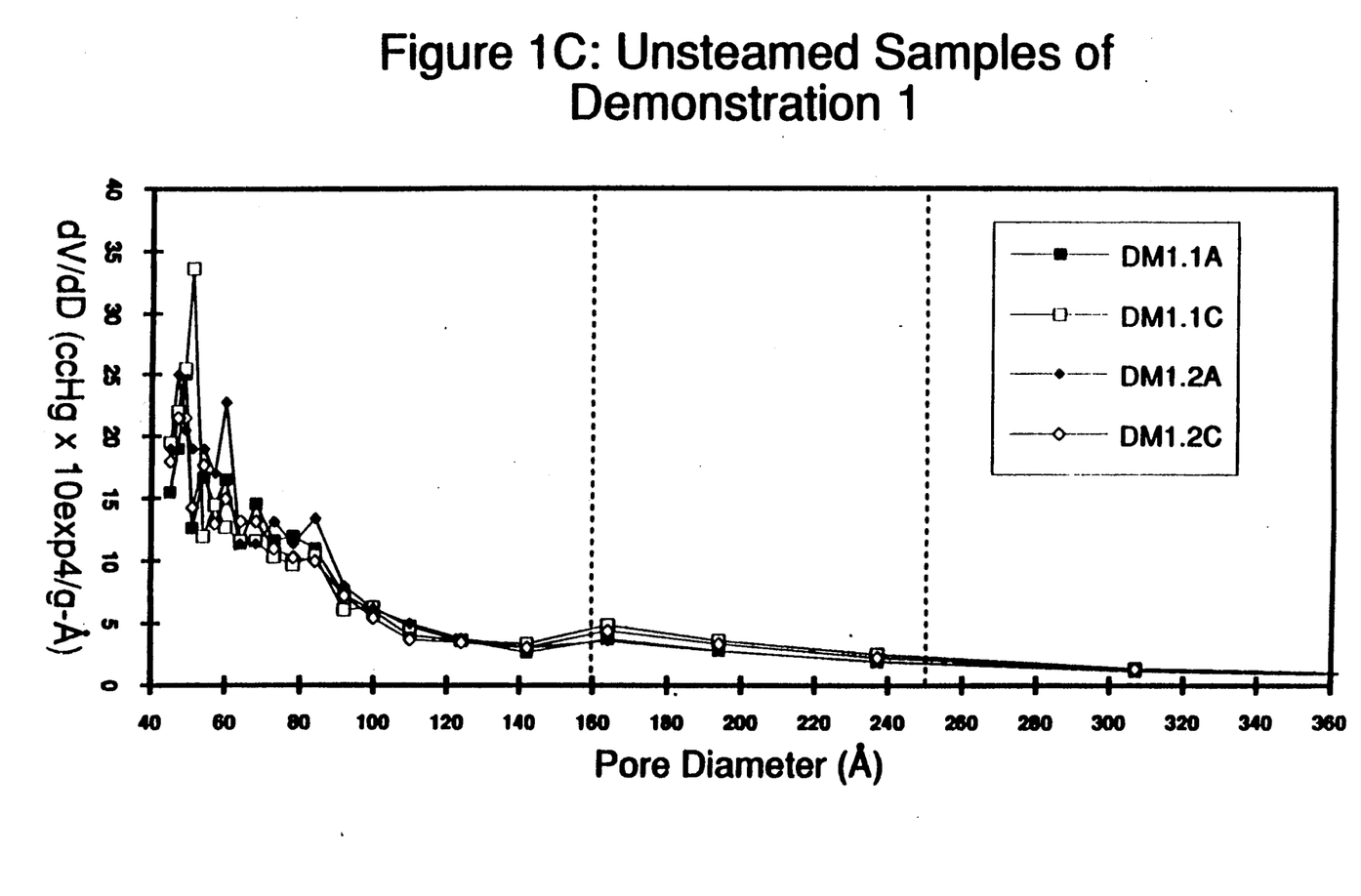
FIG. 1C depicts the pore size distribution of the unsteamed catalyst specimens of Demonstration 1.
Figure 1D:
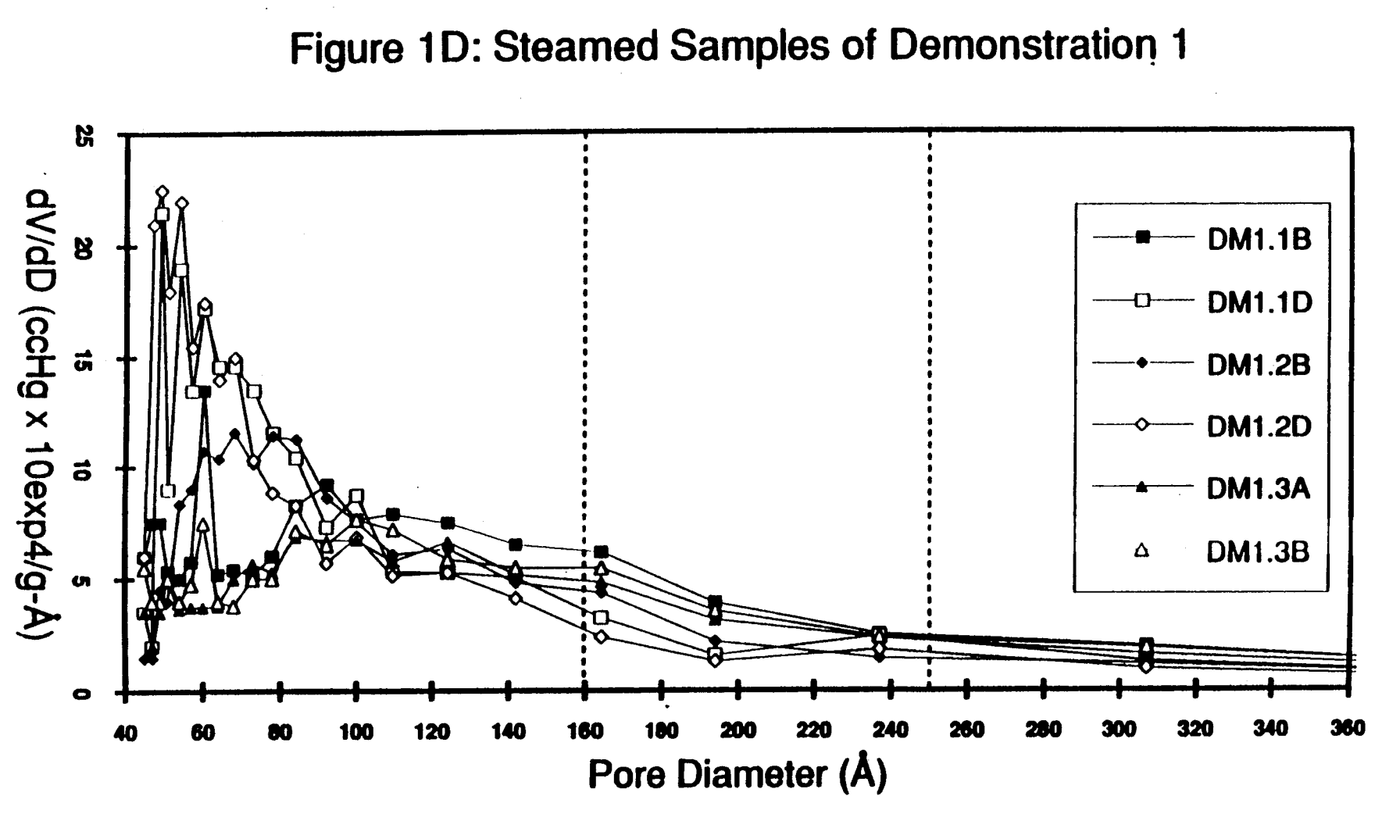
FIG. 1D the pore size distribution of the steamed catalyst specimens of Demonstration 1.

FIGS. 1C and 1D, respectively, depict the pore size distributions of both the unsteamed catalyst precursor, and the steamed catalyst obtained by steaming the catalyst precursor. The pore size distribution of the catalyst precursor, and catalyst, respectively, is profoundly different from and the performance of both is poor as contrasted with the catalyst of this invention.

EXAMPLE 2

Catalyst No. EX2

A second catalyst was made to duplicate the high solids content and pore structure of the preceding Example 1 (Catalyst No. EX1).

9.01 lbs. (0.888 solids) of Z-14G (Davison), 4.0 lbs. of Hydrite UF (Georgia Kaolin) and 0.2 lb. of HPM20 bentonite clay were mixed together dry and then dispersed in 12.0 lbs. of water and 8.0 lbs. of LUDOX HS-40 with a colloid mill and then added to a pump-around system. The pH of the zeolite/clay/sol slurry was 5.1.

After dissolving 5.22 lbs. of aluminum sulfate pentadecahydrate in 10.0 lbs. of H₂O, the solution was added to the pump around.

Finally, a 4 lb. dry weight batch of an acid alum/silica sol (6% Al₂O₃/94% SiO₂) was prepared by reacting 30 lbs. of a 12.2% SiO₂ solution (prepared by reacting 12.7 lbs. of "N" brand sodium silicate dissolved in 17.3 lbs. water with 9.1 lbs. of a solution containing 12.4%, 98% sulfuric acid and 17.6% aluminum sulfate pentadecahydrate in a rapid mixer) such that the pH did not rise above 3.4. One-fourth of this sol (ca. 10 lbs.) was added instantaneously and immediately to the pump around; and the balance was then pumped in at about 1.0 l/min.

The pH of the catalyst slurry was 3.4.
The density of the slurry was 1.19 g/cc.
The viscosity of the slurry was 1.1 cSt.

The slurry was spray dried at 550° F. inlet temperature, 350° F. outlet temperature, through a nozzle rotating at 15,000 rpm.

9.6 lbs. of product was collected from the primary cyclone and 3.1 lbs. of product was collected from the secondary cyclone.

4000 g of deionized water was pumped through two fluidized beds of 250 g each of the dried catalyst. The beds were maintained at a temperature of 80° C. during this work and subsequent ion-exchange and washing procedures.

Then, 4000 g of ammoniated 12% ammonium sulfate solution was pumped through each two 250 g batch of the catalyst at 80° C. in the fluidized bed ion exchanger.

Finally, 8000 g of deionized water was pumped through each 250 g batch of the catalyst. The catalyst batches were then calcined at 550° C. for 2 hours to give:

126 g of EX2.1A (underflow 1st batch) and
112 g of EX2.2A (overflow 1st batch).
EX1.2A and EX2.2A were steamed at 760° C. for 16 hours to give EX2.1B and EX2.2B.

| Catalyst No. | Attrition (DI) | Na Wt % | Silica Wt % | Alumina Wt % | Surface Area m²/g | Pore Volume ml/g | Unit Cell Ang. | Rel. % Crystallinity |
| --- | --- | --- | --- | --- | --- | --- | --- | --- |
| EX2.1A | 7.2 | 0.06 | 79.34 | 17.76 | 277 | 0.28 | 24.31 | 37 |
| EX2.2A | 7.2 | 0.17 | 80.11 | 17.67 | 271 | 0.26 | 24.47 | 36 |
| EX2.1B | 6.1 | N/A | N/A | N/A | 211 | 0.25 | 24.25 | 30 |
| EX2.2B | 3.2 | N/A | N/A | N/A | 181 | 0.22 | 24.22 | 29 |

| Catalyst No. | MAT | MAT H₂ Yield, Wt. % | MAT Specific Coke |
| --- | --- | --- | --- |
| EX2.1B | 71.3 | 0.0277 | 0.81 |
| EX2.1B | 71.7 | 0.0344 | 0.83 |
| EX2.2B | 70.8 | 0.0585 | 0.82 |
| EX2.2B | 70.9 | 0.0456 | 0.91 |

Figure 2:
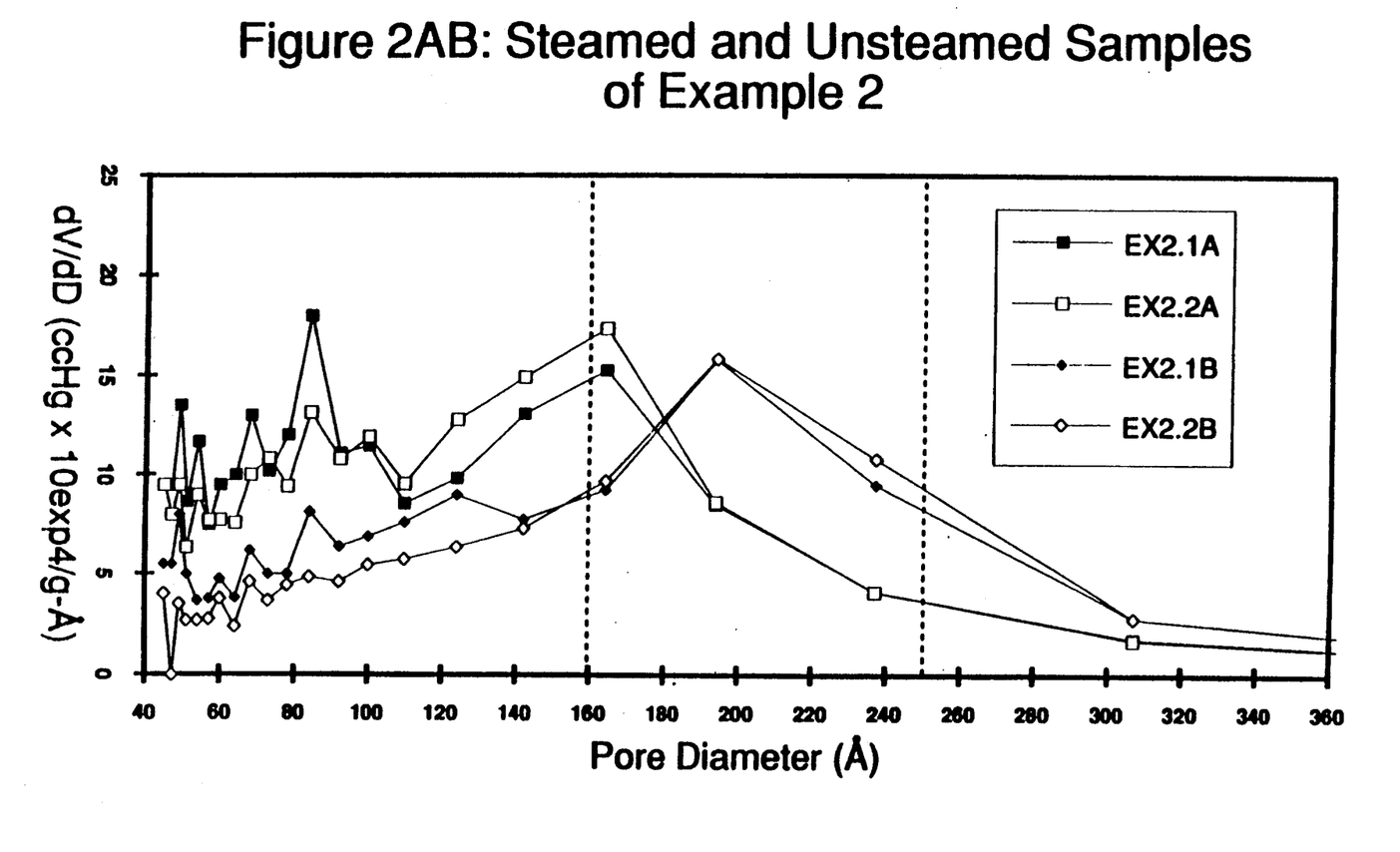

FIG. 2AB graphically depicts the pore size distribution of the matrices of both the unsteamed catalyst precursor, and catalyst formed by steaming said catalyst precursor. As in the preceeding example on steaming the catalyst precursor, the pore size distribution of the matrix portion of the precursor catalyst was shifted from a structure the pore size distribution of which was of pore diameters smaller than 15.8 nm to a structure containing a large amount of pores of diameter greater than 15.8 nm; viz. about 160 Angstroms to about 350 Angstroms.

DEMONSTRATION 2: CATALYST NO. DM2

This catalyst duplicates the low solids content and monomodal pore structure of the catalyst employed in Demonstration 1 (Catalyst No. DM1).

9.01 lbs. (0.888 solids) of Z-14G, an ultrastable Y (Davison), 4.0 lbs. of Hydrite UF (Georgia Kaolin) and 0.2 lb. of HPM20 bentonite clay were mixed together dry and then dispersed in 20.0 lbs. of water and 8.0 lbs. of Ludox HS-40 with a colloid mill and then added to a pump-around system. The pH of the zeolite/clay/sol slurry was 5.3.

After dissolving 5.22 lbs. of aluminum sulfate pentadecahydrate in 10.0 lbs. of $H_2O$, the solution was added to the pump around.

Finally, a 4 lb. dry weight batch of an acid alum/silica sol was added instantaneously to the pump around.

The pH of the catalyst slurry was 3.3
The density of the slurry was 1.16 g/cc.
The viscosity of the slurry was 1.57 cSt.

The slurry was spray dried at 550° F. inlet temperature, 350° F. outlet temperature, through a nozzle rotating at 15,000 rpm.

10.7 lbs. of product were collected from the primary cyclone and 2.3 lbs. of product were collected from the secondary cyclone.

4000 g of deionized water was pumped over a 250 g batch of the dried catalyst using a fluidized bed ion exchanger heated with a circulating bath to 80° C.

Then, 4000 g of ammoniated 12% ammonium sulfate solution was pumped over a 250 g batch of the catalyst at 80° C. in the fluidized bed ion exchanger.

Finally, 8000 g of deionized water was pumped over the catalyst at 80° C. in the fluidized bed ion exchanger. The catalyst batch was then calcined at 550° C. for 2 hrs. to give 81 g of DM2.1A (underflow).

7.7 lbs. of the spray-dried catalyst was also exchanged and steamed using the methods and techniques for EX1.3B to give DM2.2A (exchanged and calcined) and DM2.2B (exchanged, calcined, and steamed).

DEMONSTRATION 3: Catalyst No. DM3

A catalyst was made substantially in accordance with the procedure given in U.S. Pat. No. 4,968,405. This catalyst was made to demonstrate that the catalyst of this invention differs substantially from catalysts prepared according to this patent in that the pore diameters of the catalysts of this invention are substantially larger than the particle diameter of the silica sols used to make the catalysts of the patent, and further that catalysts of this invention are mechanically stronger than previous catalysts. Thus, the ultimate particle size of the silica sol particles used in the catalyst herein described was only 12 nm and the maximum in dV/dD lay at ca. 11 nm while the pore diameters for Examples 1 and 2 have two maxima each: one at ca. 10-16 nm and one at 16-30 nm.

9.01 lbs. (0.888 solids) of Z-14G (89DD7878), 4.0 lbs. of Hydrite UF (Georgia Kaolin) and 0.2 lb. of HPM20 bentonite clay were mixed together dry and then dispersed in 16.0 lbs. of water and 8.0 lbs. of LUDOX HS-40 with a colloid mill and then added to a pump-around system.

After dissolving 10.4 lbs. of aluminum sulfate pentadecahydrate in 20.0 lbs. of $H_2O$, the solution was added to the pump around.

The pH of the catalyst slurry was 3.2.
The density of the slurry was 1.23 g/cc.
The viscosity of the slurry was 2.6 cSt.

The slurry was spray dried at 550° F. inlet temperature, 350° F. outlet temperature, through a nozzle rotating at 15,000 rpm.

10.5 lbs. of product was collected from the primary

| Catalyst No. | Attrition (DI) | Na Wt % | Silica Wt % | Alumina Wt % | Surface Area m²/g | Pore Volume ml/g | Unit Cell Ang. | Rel. % Crystallinity |
| --- | --- | --- | --- | --- | --- | --- | --- | --- |
| DM2.1A | 8.1 | 0.02 | 80.03 | 18.06 | 340 | 0.302 | 24.42 | 34 |
| DM2.2A | 8.6 | 0.08 | 80.06 | 17.53 | 343 | 0.3 | 24.47 | 33 |
| DM2.1B | 8.9 | N/A | N/A | N/A | 215 | 0.24 | 24.24 | 30 |
| DM2.2B | 13.4 | N/A | N/A | N/A | 203 | 0.22 | 24.25 | 28 |

| Catalyst No. | MAT | MAT H₂ Yield. Wt. % | MAT Specific Coke |
| --- | --- | --- | --- |
| DM2.1B | 74 | 0.0313 | 0.88 |
| DM2.1B | 74.6 | 0.0227 | 0.89 |
| DM2.2B | 75.8 | 0.0363 | 0.87 |
| DM2.2B | 73.8 | 0.0377 | 0.88 |

FIG. 2CD graphically depicts the pore size distributions of the matrices of both the unsteamed and the steamed catalyst specimens. Unlike the catalyst specimens of Example 1, pores of significantly larger diameter failed to develop as a result of the steaming.

cyclone and 2.0 lbs. of product was collected from the secondary cyclone.

4000 g of deionized water was pumped over two 250 g batches of the dried catalyst using a fluidized bed ion exchanger heated with a circulating bath to 80° C.

Then, 400 g of ammoniated 12% ammonium sulfate solution was pumped over two 250 g batches of the catalyst at 80° C. in the fluidized bed ion exchanger.

Finally, 8000 g of deionized water was pumped over the catalyst at 80° C. in the fluidized bed ion exchanger. the catalyst batches were then calcined at 550° C. for 2 hours to give:

141 g of DM3.1 A (underflow 1st batch)
148 g of DM3.2 A (underflow 2nd batch)

| Catalyst No. | Attrition | Na Wt % | Silica Wt % | Alumina Wt % | Surface Area m²/g | Pore Volume ml/g | Unit Cell Ang. | Rel. % Crystallinity |
| --- | --- | --- | --- | --- | --- | --- | --- | --- |
| DM3.1A | 26.1 | 0.06 | 82.67 | 16.94 | 337 | 0.346 | 24.46 | 32 |
| DM3.2A | 21.9 | 0.06 | 81.84 | 17.19 | 317 | 0.348 | 24.45 | 32 |

DM3.1 A and DM3.2 A were steamed at 1 atmosphere for 16 hours at 760° C. to give DM3.1 B and DM3.2 B.

| Catalyst No. | Attrition | Na Wt % | Silica Wt % | Alumina Wt % | Surface Area m²/g | Pore Volume ml/g | Unit Cell Ang. | Rel. % Crystallinity |
|---|---|---|---|---|---|---|---|---|
| DM3.1B | 4.9 | 0.06 | 83.2 | 17.5 | 210 | 0.304 | 24.23 | 24 |
| DM3.2B | 12.5 | 0.06 | 81.9 | 17.2 | 211 | 0.309 | 24.23 | 25 |

| Catalyst No. | MAT | MAT H₂ Yield, Wt. % | MAT Specific Coke |
|---|---|---|---|
| DM3.1B | 72.3 | 0.0469 | 0.83 |
| DM3.1B | 72.3 | 0.0442 | 0.88 |
| DM3.2B | 72.3 | 0.0525 | 0.8 |
| DM3.2B | 73.7 | 0.0387 | 0.81 |

Figure 3:
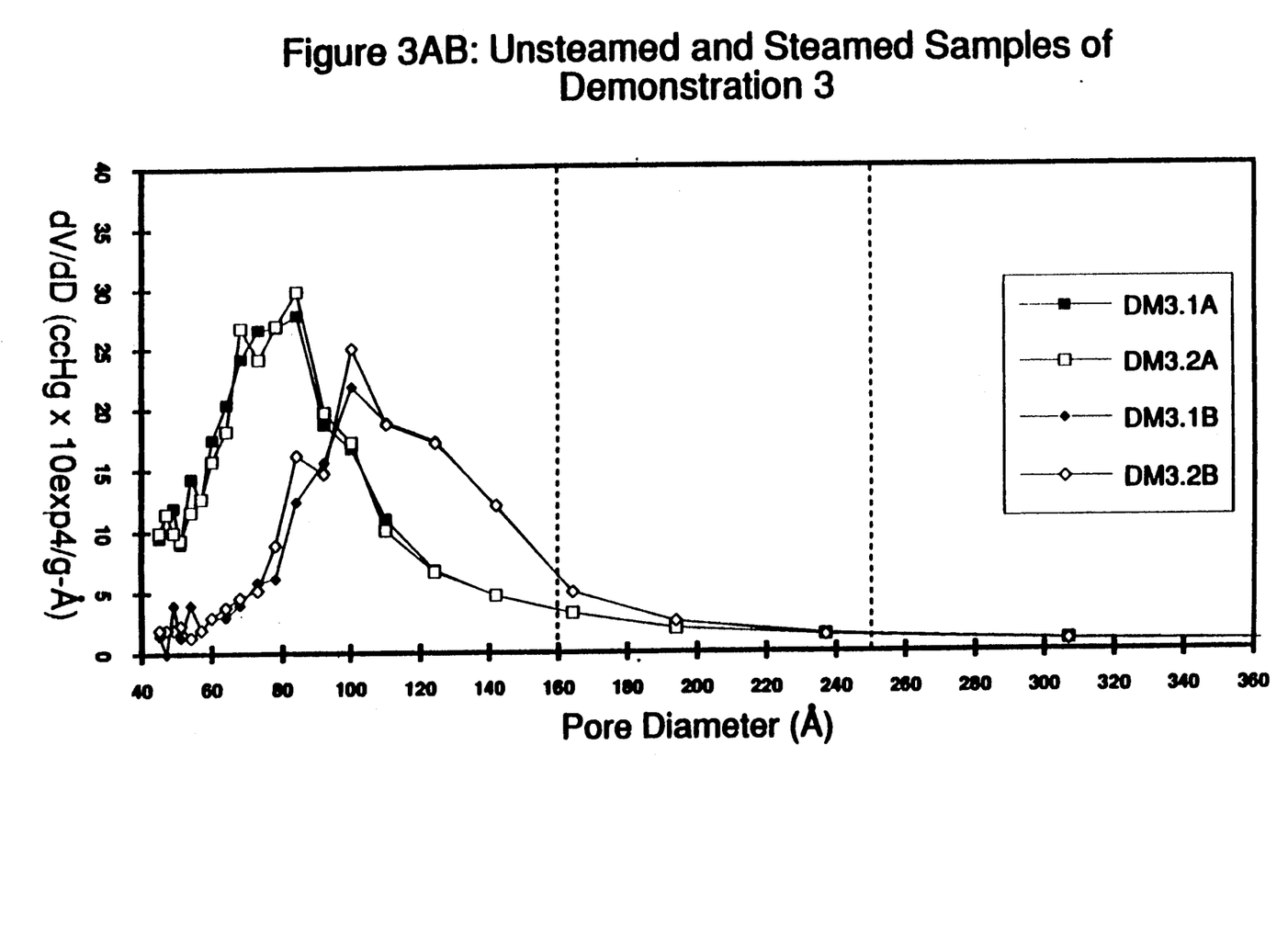

FIG. 3AB depicts graphically the pore size distributions of both the catalyst precursor, or unsteamed catalyst, and the steamed catalyst, respectively. The matrices of neither possess the pore structure required of the catalysts of this invention. As seen from the graph, steaming of the catalyst precursor failed to develop the pore structure required in the matrices of the catalysts of this invention.

DEMONSTRATION 4: CATALYST NO. DM4

The following data is exemplary of catalysts formed pursuant to the teaching of U.S. Pat. No. 4,987,110 except that the catalyst is formed from ultrastable Y, as used in the preparations described herein, instead of a rare-earth exchanged LZ-Y82 as described in the patent. This demonstration shows that while the catalyst has high attrition resistance, the selectivity of the catalyst is poor as compared with the catalysts of this invention.

9.01 lbs. of Z-14 G, an ultrastable Y (Davison) and 20.0 lbs. of 2326 (Nalco) silica sol were mixed together with 6.0 lbs. of Hydrite UF (Georgia Kaolin) and then passed through the colloid mill and set aside. 6.36 lbs. of Reheis chlorhydrol was dissolved in 8.0 lbs. of distilled water and mixed in a pump-around and then the Z-14 G/Nalco-2326/Hydrite UF slurry was poured into the pump-around slowly enough to keep the mixture from clotting.

The pH of the zeolite/clay/sol/chlorhydrol slurry was 4.3.

The density of the slurry was 1.35 g/cc.

The viscosity of the slurry was 1.22 cSt.

The slurry was spray dried at 550° F. inlet temperature, 350° F. outlet temperature, through a nozzle rotating at 15,000 rpm.

8.0 lbs. of product were collected from the primary cyclone and 1.9 lbs. of product were collected from the secondary cyclone.

Ca 8 lbs. of DM4 were exchanged in a continuous fluidized bed ion exchanger by passing first 100 lbs. of water, then 100 lbs. of 5% ammonium sulfate, and then 100 lbs. of water through the catalyst at ca. 70° C. The catalyst was then dried and calcined at 550° C. for 2 hrs. to give ca. 5 lbs. of DM4.1 A. DM4.1 A was steamed at 1400° F. for 16 hrs. to give DM4.1 B.

| Catalyst No. | Na Wt % | Silica Wt % | Alumina Wt % | Surface Area m²/g | Pore Volume ml/g | Unit Cell Ang. | Rel. % Crystallinity | Attrition (DI) |
|---|---|---|---|---|---|---|---|---|
| DM4.1A | 0.08 | 65.2 | 35.4 | 299 | 0.237 | 24.45 | 27 | 1.1 |
| DM4.1B | | | | 204 | 0.217 | 24.20 | 32 | |

| Catalyst No. | MAT | MAT H₂ Yield, Wt. % | MAT Specific Coke |
|---|---|---|---|
| DM4.1B | 72.2 | 0.0405 | 1.06 |
| DM4.1B | 73.0 | 0.0373 | 0.89 |
| DM4.1B | 74.2 | 0.0471 | 0.86 |
| DM4.1B | 74.3 | 0.0384 | 0.93 |

Figure 4:
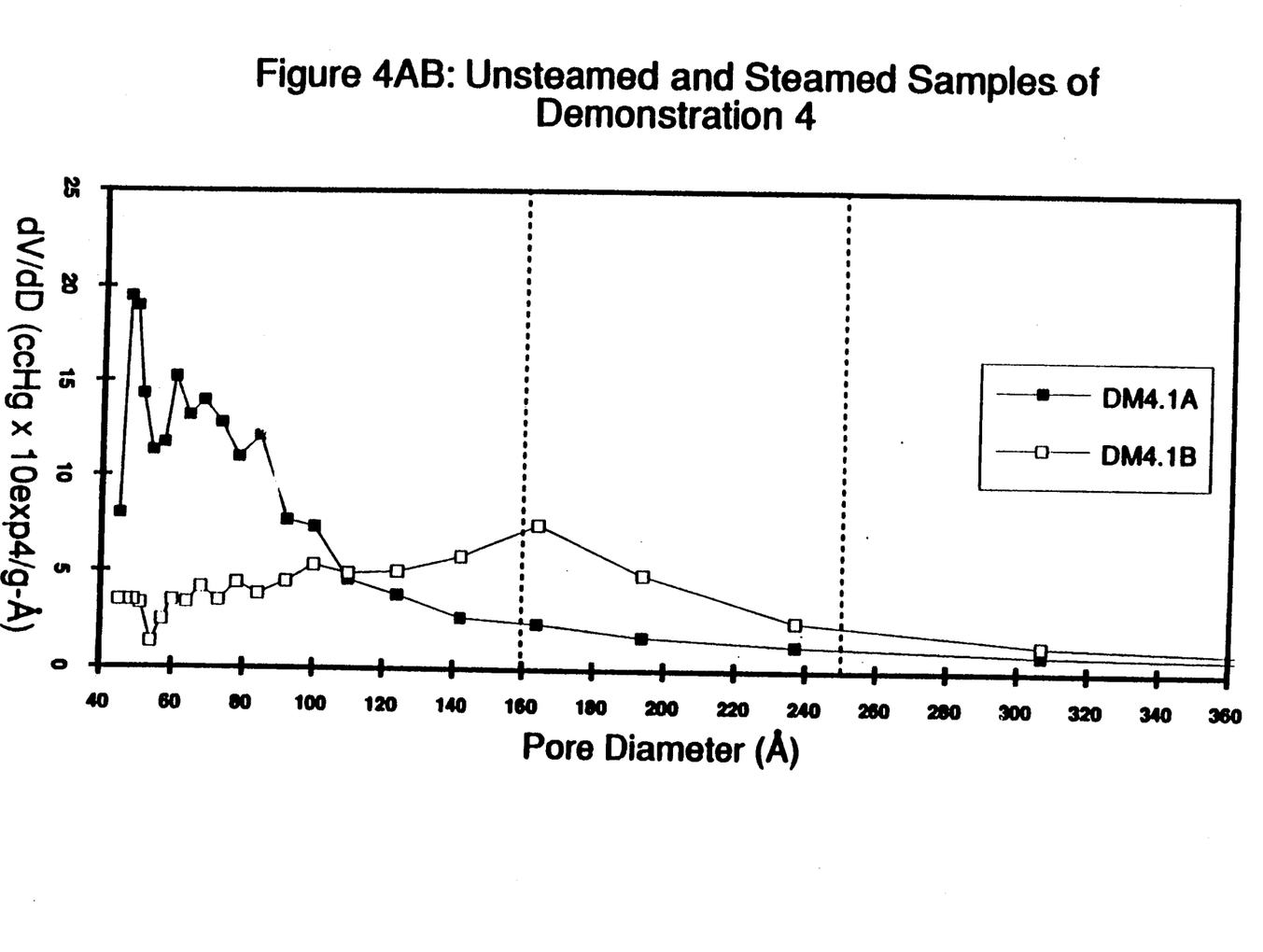

FIG. 4AB depicts graphically the pore size distributions of both the catalyst precursor, or unsteamed catalyst, and the steamed catalyst. As in the preceding demonstration, the matrices of neither the pore structure of the catalyst precursor, or the steamed catalyst, provides the pore structure required for the catalysts of this invention. Indeed, the Davison attrition indices of the fresh calcined catalyst produced in accordance with Demonstrations 1 through 3 range between 7 and 26, whereas in contrast, the Davison attrition indices of the fresh calcined catalysts produced in Examples 1 and 2 range between 2.6 and 7. The catalysts of this invention are thus substantially stronger mechanically than catalysts made via the procedure described in U.S. Pat. No. 4,968,405.

Having described the invention, what is claimed is:

1. A catalytic cracking catalyst for converting a hydrocarbon feedstock at elevated temperature in the substantial absence of hydrogen, into lower average molecular weight, lower boiling hydrocarbon transportation fuel which comprises a crystalline aluminosilicate zeolite having a silica:alumina mole ratio of about 2:1 and greater, and uniform pore diameters ranging about 4 Angstroms to about 15 Angstroms, in concentration ranging from about 15 percent to about 80 percent, based on the total weight of the catalyst, a matrix comprised of silica within which the crystalline aluminosilicate zeolite is dispersed, said matrix being characterized as porous and the pores as having a polymodal pore size distribution, as measured by mercury porosimetry, a first mode wherein at least 75 percent of the pore volume measured between 45 Angstroms and 2000 Angstroms is in pores greater than 160 Angstroms in diameter, and a second mode wherein up to about 20 percent of the pore diameters are greater than 100 Angstroms but less than 160 Angstroms in diameter, and the attrition-resistance of the catalyst, as measured by the Davison Index, ranges from about 1 to about 8, wherein the silica matrix portion of said catalyst is prepared from a silica sol made via an ion-exchanged process, and an acidic silica sol prepared by the reaction of sodium silicate, an acid and an aluminum salt, and an aluminum salt of a mineral acid, and wherein the sol is not converted to a gel during catalyst preparation.

2. The catalyst composition of claim 1 wherein the concentration of zeolite within the catalytic cracking catalyst ranges from about 30 percent to about 60 percent.

3. The catalyst composition of claim 1 wherein the concentration of the zeolite ranges from about 35 percent to about 55 percent.

4. The catalyst composition of claim 1 wherein from about 80 percent to about 90 percent of the pore sizes measured in the first mode are greater than 160 Angstroms diameter.

5. The catalyst composition of claim 1 wherein from about 5 percent to about 10 percent of the pore sizes measured in the second mode are greater than 100 Angstroms in diameter, but less than 160 Angstroms in diameter.

6. The catalyst composition of claim 1 wherein the pore size distribution of the pores constituting said first mode ranges from about 160 Angstroms to about 400 Angstroms in diameter, and the pore size distribution of the pores constituting said second mode ranges from about 100 Angstroms to about 160 Angstroms in diameter.

7. The catalyst composition of claim 6 wherein the pore size distribution of said first mode ranges from about 200 Angstroms to about 250 Angstroms, and the pore size distribution of said second mode ranges from about 110 Angstroms in diameter to about 150 Angstroms in diameter.

8. The catalyst composition of claim 1 wherein the concentration of zeolite within the cracking catalyst ranges from about 30 percent to about 60 percent, the zeolite is one having a silica:alumina mole ratio greater than 2:1, the pore size distribution of the pores constituting said first mode ranges from about 160 Angstroms to about 400 Angstroms in diameter, and the pore size distribution of the pores constituting said second mode ranges from about 100 Angstroms in diameter to about 160 Angstroms in diameter.

9. The catalyst composition of claim 8 wherein the pore size distribution of the pores constituting said first mode ranges from about 200 Angstroms to about 250 Angstroms, and the pores constituting said second mode ranges from about 110 Angstroms in diameter to about 150 Angstroms in diameter.

10. The catalyst composition of claim 8, wherein the Davison Index of the catalyst ranges from about 1 to about 5.

11. A catalytic cracking catalyst for converting a hydrocarbon feedstock at elevated temperature in the substantial absence of hydrogen, into lower average molecular weight, lower boiling hydrocarbon transportation fuel which comprises a crystalline aluminosilicate zeolite having a silica:alumina mole ratio greater than 2:1, and uniform pore diameters ranging from about 4 Angstroms to about 15 Angstroms in diameter, in concentration ranging from about 30 percent to about 60 percent, based on the total weight of the catalyst, a matrix comprised of silica and clay within which the crystalline aluminosilicate zeolite is dispersed, said matrix being characterized as porous and the pores as having a bimodal pore size distribution, as measured by mercury porosimetry, a first mode wherein from about 80 percent to about 90 percent of the pore volume measured between 45 Angstroms and 2000 Angstroms is in pores ranging from about 160 Angstroms in diameter to about 400 Angstroms in diameter, and a second mode wherein from about 5 percent to about 10 percent of the pores are of diameter ranging above about 100 Angstroms to about 160 Angstroms, and the attrition-resistance of the catalyst, as measured by the Davison Index ranges from about 1 to about 8, wherein the silica matrix portion of said catalyst is prepared from a silica sol made via an ion-exchanged process, and an acidic silica sol prepared by the reaction of sodium silicate, an acid and an aluminum salt, and an aluminum salt of a mineral acid, and wherein the sol is not converted to a gel during catalyst preparation.

12. The catalyst composition of claim 11 wherein the concentration of zeolite within the catalyst ranges from about 35 percent to about 55 percent.

13. The catalyst composition of claim 11 wherein the pore size distribution of said first mode ranges from about 200 Angstroms to about 250 Angstroms, and the pore size distribution of said second mode ranges from about 110 Angstroms in diameter to about 150 Angstroms in diameter.

14. The catalyst composition of claim 11 wherein the Davison Index of the catalyst ranges from about 1 to about 5.

* * * * *